United States Patent
Trench Roca et al.

(10) Patent No.: US 9,404,789 B2
(45) Date of Patent: Aug. 2, 2016

(54) KITCHEN WORKTOP WITH WEIGHING MEANS

(71) Applicant: COMPAÑIA ESPAÑOLA DE ELECTROMENAJE S.A., Oliana (Lleida) (ES)

(72) Inventors: Lluís Trench Roca, Sallent (ES); Josep Alet Vidal, Oliana (ES); Fidel Montraveta Montraveta, Oliana (ES)

(73) Assignee: COMPAÑIA ESPAÑOLA DE ELECTROMENAJE S.A.

( * ) Notice: Subject to any disclaimer, the term of this patent is extended or adjusted under 35 U.S.C. 154(b) by 248 days.

(21) Appl. No.: 14/357,878

(22) PCT Filed: Oct. 5, 2012

(86) PCT No.: PCT/ES2012/000259
§ 371 (c)(1),
(2) Date: May 13, 2014

(87) PCT Pub. No.: WO2013/102685
PCT Pub. Date: Jul. 11, 2013

(65) Prior Publication Data
US 2014/0312026 A1    Oct. 23, 2014

(30) Foreign Application Priority Data
Jan. 4, 2012 (ES) .................................. 201230010

(51) Int. Cl.
*A47J 36/16* (2006.01)
*A47J 36/34* (2006.01)
(Continued)

(52) U.S. Cl.
CPC ............... *G01G 19/56* (2013.01); *A47J 36/165* (2013.01); *F24C 7/083* (2013.01); *G01G 23/02* (2013.01); *H05B 3/74* (2013.01); *F24C 7/08* (2013.01); *H05B 1/0266* (2013.01)

(58) Field of Classification Search
None
See application file for complete search history.

(56) References Cited

U.S. PATENT DOCUMENTS 4,476,946 A * 10/1984 Smith .................. G01G 3/1402
177/144
4,757,181 A * 7/1988 Sakamoto ................ G01G 7/06
177/210 C (Continued)

FOREIGN PATENT DOCUMENTS

DE          10344337 A1    5/2005
DE     102007013138 A1   10/2007

(Continued)

OTHER PUBLICATIONS

DE 102007013138 A1, Schneider, Oct. 2007, "Cooker has Safety System," partial translation.*

(Continued)

*Primary Examiner* — Joseph M Pelham
(74) *Attorney, Agent, or Firm* — Hess Patent Law Firm LLC; Robert J. Hess

(57) ABSTRACT

A kitchen worktop having a support plate (2) with a treatment area (4) on which a container is placed (50), and a heating device (34) located in the treatment area under the support plate. Weight transducers (38) are fixed both to the support plate (2) and to a movable portion (24a) of a series of actuators (24), the fixed portion (24b) of which is fixed to a structure (11). A control device allows activating the actuators (24) in order to move the weight transducers (38) and the support plate (2) between a rest position in which the support plate (2) rests on the structure (11), and a weighing position in which the support plate (2) is supported only by the weight transducers (38) in order to enable a weighing operation.

15 Claims, 3 Drawing Sheets

(51) Int. Cl.
*G01G 19/52* (2006.01)
*H05B 3/68* (2006.01)
*H05B 3/74* (2006.01)
*G01G 19/56* (2006.01)
*G01G 23/02* (2006.01)
*H05B 1/02* (2006.01)
*F24C 7/08* (2006.01)

(56) References Cited

U.S. PATENT DOCUMENTS

| | | |
|---|---|---|
| 5,183,996 A | 2/1993 | Hazan et al. |
| 5,549,382 A | 8/1996 | Correia, II |
| 6,268,593 B1* | 7/2001 | Sakai ............ H05B 6/6464 177/48 |
| 2012/0286080 A1* | 11/2012 | Sladecek ............ A47J 27/004 241/65 |
| 2013/0001220 A1 | 1/2013 | Alet Vidal et al. |
| 2013/0042767 A1* | 2/2013 | Alet Vidal ............ A47J 36/16 99/357 |

FOREIGN PATENT DOCUMENTS

| | | |
|---|---|---|
| EP | 2133139 A1 | 12/2009 |
| ES | 2367281 A1 | 11/2011 |
| WO | WO 2013/102685 A1 | 7/2013 |

OTHER PUBLICATIONS

Motor paso a paso. Wikipedia [on line] [retrieved on Nov. 29, 2012] [retrieved of http://es.wikipedia.org/w/index.php?title=Motor_paso_a_paso&oldid=52049290.

* cited by examiner

KITCHEN WORKTOP WITH WEIGHING MEANS

FIELD OF THE ART

The present invention relates to a kitchen worktop including weighing means for weighing a container, or more preferably the content of such container, supported thereon.

BACKGROUND OF THE INVENTION

Spanish patent application P 201000344 discloses a kitchen worktop with rotary blade driving means comprising a continuous support plate made of glass or glass ceramic provided with a treatment area on which a container can be placed. The support plate is supported by weighing means including weight transducers connected to the support plate and to a fixed structure. A lower magnetic coupling member operated by a drive motor is rotatably arranged in said treatment area and below the support plate. The lower magnetic coupling member is capable of magnetically transmitting torque to an upper magnetic coupling member connected to rotary blades installed in said container. The worktop also includes activation/deactivation means for substantially activating and deactivating the magnetic field exerted by the lower magnetic coupling member through the support plate.

A drawback of the kitchen worktop described in said Spanish patent application P 201000344 is that the support plate is permanently supported on the weight transducers, even when a weighing operation is not being performed, which provides a certain feeling of instability in the support plate due to the necessary elasticity of the weight transducers, and an unnecessary early deterioration of the weight transducers due to the stress to which the transducers are permanently subjected.

DESCRIPTION OF THE INVENTION

An objective of the present invention is to provide a kitchen worktop with weighing means that provides a stable position to the support plate during the time periods in which a weighing operation is not being performed and does not subject the weight transducers to permanent stress.

The present invention contributes to achieving the foregoing and other objectives by providing a kitchen worktop with weighing means comprising a continuous support plate made of glass or glass ceramic, supported on a fixed structure by weighing means, where said support plate has at least one treatment area on which a container can be placed, and heating means located in said treatment area below said support plate.

Said weighing means comprise a plurality of weight transducers fixed both to the support plate and to a movable portion of respective actuators which has a fixed portion fixed to the fixed structure, and a control device whereby said actuators can be activated for moving said weight transducers and the support plate between a rest position in which the support plate rests on the fixed structure, and a weighing position in which the support plate is supported only by the weight transducers to allow a weighing operation.

Therefore, during normal operation of the kitchen worktop, the support plate is supported on the fixed structure in the rest position, such that the support plate remains stable and the weight of the support plate and associated mechanisms, together with the weight of the container and or of several containers placed on the support plate and the weight of their content, are borne by the fixed structure. The actuators are activated only when a weighing operation is to be performed, such that the support plate will be supported only by the weight transducers, which thus generate a weighing signal that is received and processed in a corresponding circuit of the control device.

Typically, the weight of the content of a single container placed on the support plate is to be known, and in a known manner the control device is configured to calculate a total weight value from the average of the different readings obtained from several weight transducers, and to automatically deduct from the total weight value obtained the tare of the support plate and of the associated mechanisms, as well as the tare of the container if it has been previously read and saved in a memory.

In one embodiment, each of the weight transducers comprises a deformable body fixed at one end to the support plate and at the other end to said movable portion of the corresponding actuator, and a strain gauge associated with said deformable body and connected to an electronic circuit of said control device. The deformations experienced by the deformable body as a result of the weight applied thereon are converted by the strain gauge into an electrical signal proportional to the deformation and therefore to the weight.

In one embodiment, the support plate has a plate perimeter edge overlapping a support perimeter edge of the fixed structure, and one or more elastic elements which are compressed between both edges when the support plate is in the rest position are arranged between said plate perimeter edge and said support perimeter edge. These one or more elastic elements cushion the contact between the support plate and the fixed structure. In a preferred embodiment, there is a single elastic element in the form of an elastic gasket attached to a lower surface of the support plate along the entire plate perimeter edge, which also acts as a hermetic seal between the support plate and the fixed structure in the rest position.

In one embodiment, the support plate has a rectangular shape defining four corners and is supported by four of the weight transducers fixed to the support plate in positions adjacent to each of said four corners. Nevertheless, the support plate could alternatively have other shapes other than being rectangular and/or could generally be supported by only three weight transducers, whereby it would have isostatic equilibrium, or by more than four weight transducers.

The kitchen worktop of the present invention can include rotary blade driving means associated with a treatment area of the support plate. These rotary blade driving means generally comprise rotating magnetic field generating means for creating a rotating magnetic field in said treatment area below the support plate, said rotating magnetic field being sized to magnetically transmit torque to an upper magnetic coupling member connected to rotary blades installed in a cooking container located on the treatment area of the support plate. The rotary blade driving means are preferably associated with activation/deactivation means that allow substantially activating and deactivating said magnetic field exerted by the rotating magnetic field generating means through the support plate.

In one embodiment, and in a manner similar to that the described in said Spanish patent application P 201000344, the rotating magnetic field generating means comprise a lower magnetic coupling member rotatably arranged in the treatment area below the support plate and an operatively connected drive motor for rotating said lower magnetic coupling member, and the activation/deactivation means comprise position changing means configured for moving the lower magnetic coupling member between an operative position in which the lower magnetic coupling member is close enough to the support plate so as to magnetically transmit said torque, and an inoperative position in which the lower magnetic coupling member is far enough from the support plate so as to not transmit torque.

In another embodiment, the rotating magnetic field generating means comprise a plurality of electromagnets distributed in a circular arrangement in the treatment area below the support plate. These electromagnets are controlled by the control device such that they are consecutively activated and deactivated to create said rotating magnetic field. In this case, the activation/deactivation means are included in the control device and comprise simply deactivating the electromagnets.

In both embodiments, the rotary blade driving means are supported in the support plate, and in the embodiment including said position changing means, these means are also supported in the support plate. The weight of the rotary blade driving means and of the position changing means is known and is memorized together with the weight of the support plate and of the heating means as the tare to be deducted from the total weight value obtained from the average of the readings of the weight transducers.

In a preferred embodiment, the control device comprises a user interface associated with the support plate and connected to an electronic power and control circuit. This user interface is configured for allowing a user to control generally the functions of the worktop, and more particularly the functions of the weighing means and/or of the heating means and/or of the rotary blade driving means and/or of the position changing means.

BRIEF DESCRIPTION OF THE DRAWINGS

The foregoing and other features and advantages will become more evident based on the following description of an embodiment in reference to the attached drawings in which.

DETAILED DESCRIPTION OF AN EMBODIMENT

Figure 1:
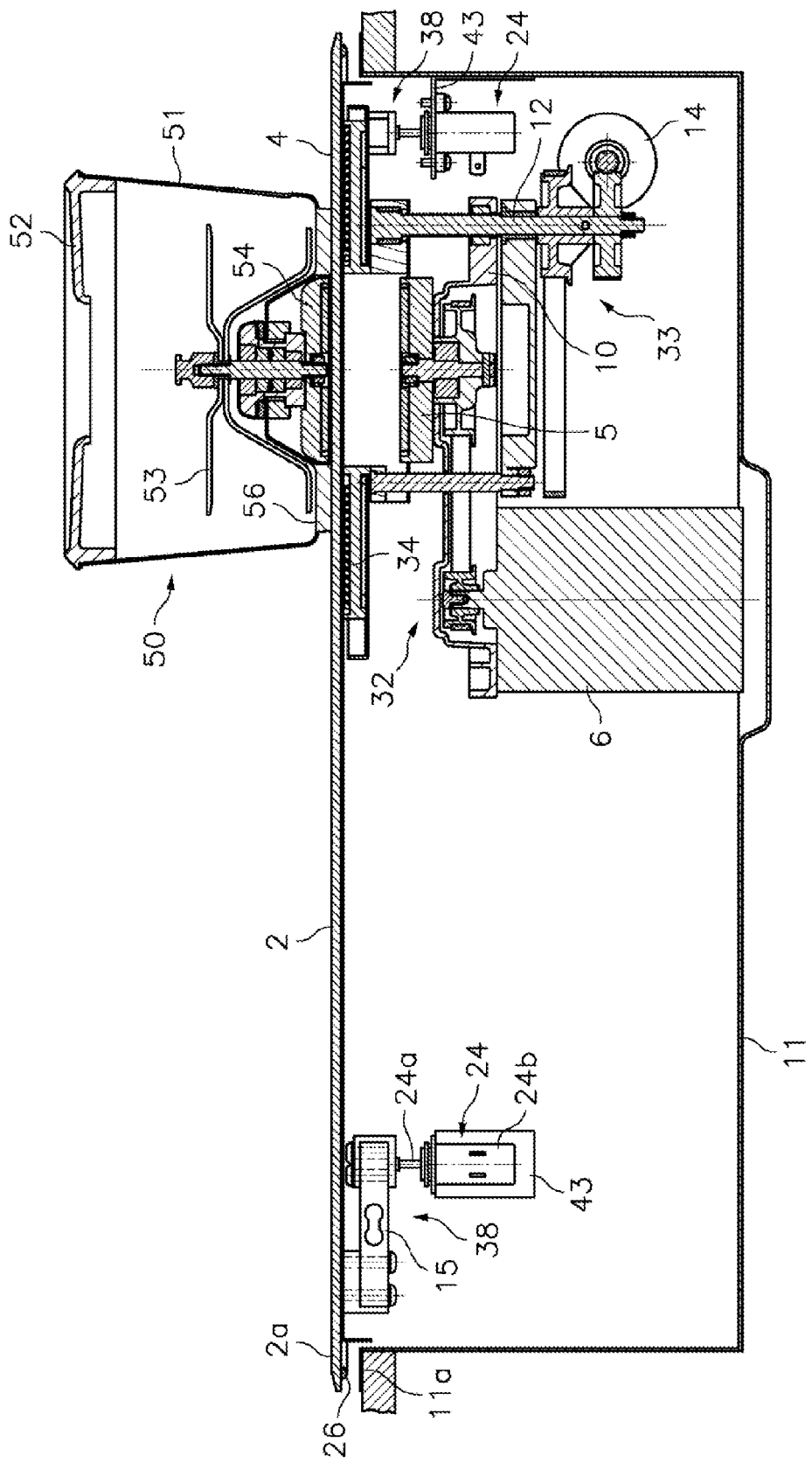
FIG. 1 is a schematic sectional side view of a kitchen worktop with weighing means according to an embodiment of the present invention with a support plate in a weighing position and with a container placed on the support plate.

Referring to the drawings, FIG. 1 shows a kitchen worktop with weighing means according to an embodiment of the present invention, which comprises a continuous support plate 2 made of glass or glass ceramic, supported on a fixed structure 11 by weighing means that will be described in detail below. Said support plate 2 has several visually indicated treatment areas 4, 41, 42 of different sizes (also see FIG. 4), on each of which areas a container 50 can be placed. Heating means 34 are located in said treatment areas 4, 41, 42, and below said support plate 2, although for greater clarity the heating means 34 are only shown in one of the treatment areas 4 in FIG. 1. Likewise, FIGS. 1 and 4 only show a container 50 on one of the treatment areas 4.

Figure 4:
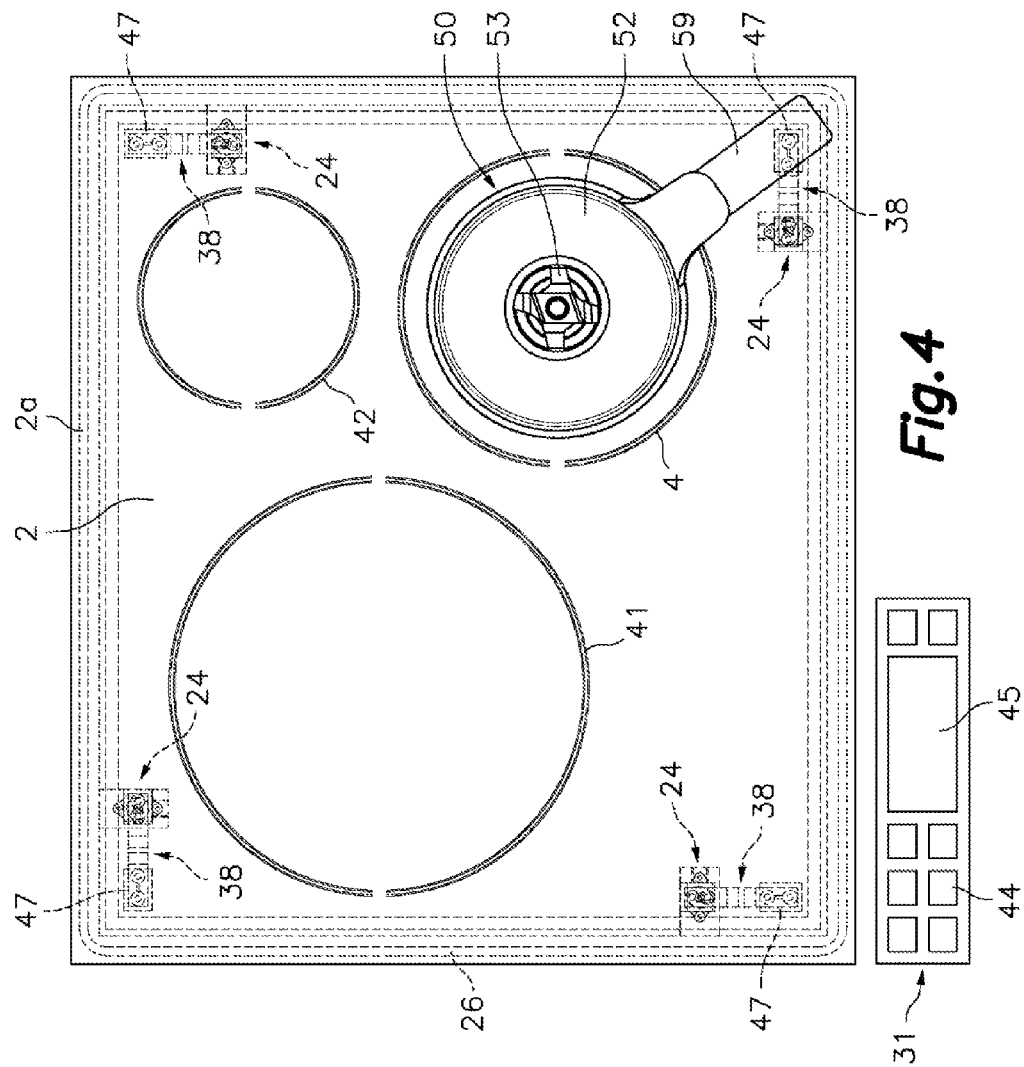
FIG. 4 is a bottom plan view of the kitchen worktop with the container placed on the support plate.

In relation to FIG. 4, the support plate 2 has a rectangular shape defining four corners, and said weighing means comprise four weight transducers 38 fixed to the support plate 2 in positions adjacent to said four corners. Each weight transducer 38 is furthermore fixed to a movable portion 24a of a respective actuator 24 which has a fixed portion 24b fixed to the fixed structure 11.

Figure 2:
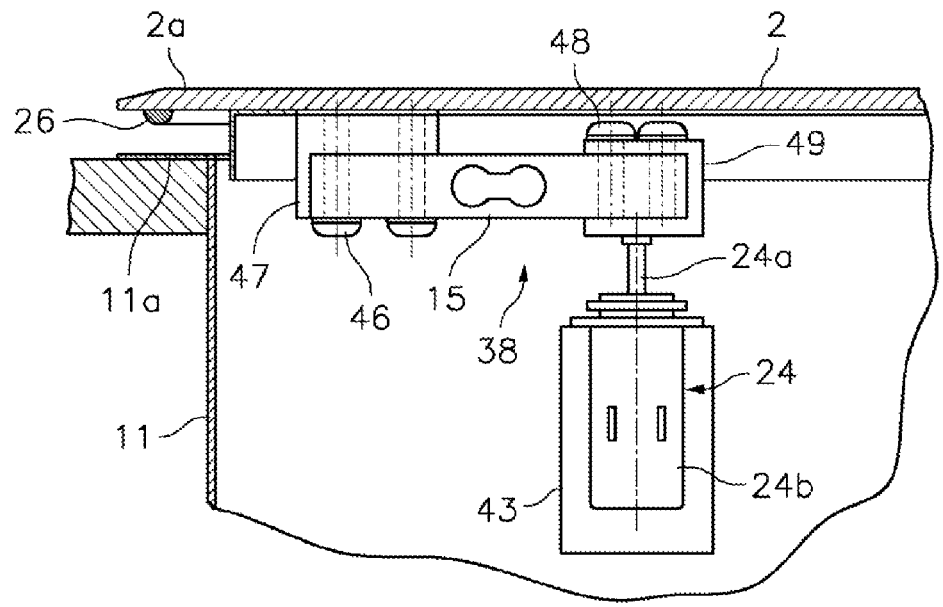
FIG. 2 is a view of an enlarged detail of FIG. 1 illustrating the weighing means with the support plate in the weighing position.
Figure 3:
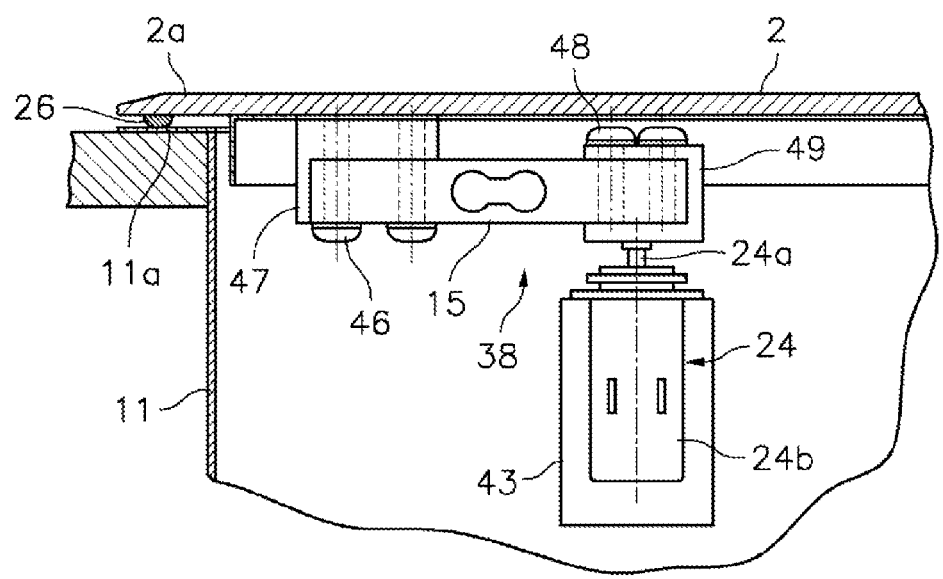
FIG. 3 is a view similar to FIG. 2 with the support plate in a rest position.

As better shown in FIGS. 2 and 3, each of the weight transducers 38 comprises a deformable body 15 having an end fixed by means of screws 46 to a spacer block 47 which is in turn fixed by means of adhesive, for example, to the support plate 2 and another opposite end fixed by means of screws 48 to a support body 49 in turn fixed to said movable portion 24a of the corresponding actuator 24, the fixed portion 24b of which is fixed to the fixed structure 11 by means of a bracket 43 or the like. The deformable body 15 is associated with a strain gauge (not shown) connected to an electronic circuit of a control device whereby said actuators 24 can be activated. When the actuators 24 are deactivated, their movable portions 24a are retracted and the support plate 2 is in a rest position (FIG. 3) in which the support plate 2 rests on the fixed structure 11.

The support plate 2 has a plate perimeter edge 2a overlapping a support perimeter edge 11a of the fixed structure 11, and an elastic element 26 such as an elastic gasket, for example, is attached to a lower surface of the support plate 2 along the entire plate perimeter edge 2a. Therefore, said elastic element 26 is compressed between the support plate 2 and the fixed structure 11 when the support plate 2 is in said rest position. Alternatively, the elastic element could be attached to the fixed structure 11 or there may be a plurality of individual elastic elements attached either to the support plate 2 or to the fixed structure 11 with an equivalent result.

When the actuators 24 are activated, their movable portions 24a extend and lift the weight transducers 38, which in turn lift the support plate 2 to a weighing position (FIGS. 1 and 2) in which the support plate 2 no longer contacts the fixed structure 11 and is supported only by the weight transducers 38. This weighing position allows performing a weighing operation without interferences. In the illustrated embodiment, the actuators 24 are electromagnetic actuators, although they may alternatively be, for example, electric motors or hydraulic or pneumatic fluid dynamic actuators, among others.

In the illustrated embodiment, one of the treatment areas of the support plate 2, particularly treatment area 4, is associated with rotary blade driving means 32 which serve for rotating rotary blades 53 installed in a cooking container 50 of a known type, which can be located on the treatment area 4 of the support plate 2. This cooking container 50 comprises a container wall 51 with a bottom 56, an upper opening that can be closed with a lid 52, and a handled 59 fixed to said container wall 51. Said rotary blades 53 are connected to an upper magnetic coupling member 54 arranged in a concavity formed at the bottom 56, such that when the cooking container 50 is placed on the support plate 2, the upper magnetic coupling member 54 is as a short distance from and facing an upper surface of the support plate 2 without contacting same.

Said rotary blade driving means 32 comprise a lower magnetic coupling member 5 rotatably arranged in the treatment area 4 below the support plate 2 and a drive motor 6 which rotates said lower magnetic coupling member 5 by means of mechanical transmission. The rotary blade driving means 32 are associated with activation/deactivation means comprising position changing means 33 configured for moving the lower magnetic coupling member 5 between an operative position (not shown) in which the lower magnetic coupling member 5 is close enough to the support plate 2 so as to magnetically transmit torque to the upper magnetic coupling member 54 of the cooking container 50 located on the treatment area 4 of the support plate 2, and an inoperative position (FIG. 1) in which the lower magnetic coupling member 5 is far enough from the support plate 2 so as to not transmit said torque.

The position changing means 33 comprise screws 12 rotatably supported in the support plate 2 and coupled to corresponding nuts fixed in a movable support 10 supporting the lower magnetic coupling member 5, the drive motor 6 and the corresponding mechanical transmission. A position changing motor 14 rotates the screws 12 by means of another mechanical transmission to move the movable support 10 up and down and to thereby move the lower magnetic coupling member 5 between its operative and inoperative positions.

It can be seen in the illustrated embodiment that the rotary blade driving means 32 and the position changing means 33 are supported in the support plate 2.

Said control device comprises a user interface 31 (FIG. 4) associated with the support plate 2 and connected to an electronic power and control circuit of the kitchen worktop. This user interface 31 can include several buttons or keys 44 and a display screen 45 whereby a user can control the weighing means, the heating means 34, the rotary blade driving means 32 and said position changing means 33.

To obtain the weight of the content of a single container placed in any position on the support plate, the control device calculates a total weight value from the average of the different readings obtained of several weight transducers, and automatically subtracts the tare of the support plate and of the associated mechanisms which is known and recorded in a memory. Furthermore, the user may have previously obtained the tare of the empty container, which also would have been saved in the memory, such that the tare of the empty container will also be deducted from the total weight value obtained and the value of the weight of the content of the container will be shown on the display screen 45.

A person skilled in the art will be capable of introducing modifications and variations based on the described embodiment shown without departing from the scope of the present invention as it is defined in the attached claims.

The invention claimed is:

1. A kitchen worktop with weighing means comprising a continuous support plate (2) made of glass or glass ceramic, supported on a fixed structure (11) by weighing means including a plurality of weight transducers (38), said support plate (2) having at least one treatment area (4) on which a container can be placed, and heating means (34) located in said treatment area (4) below said support plate (2), said weighing means comprising a plurality of weight transducers (38) are fixed both to the support plate (2) and to a movable portion (24*a*) of respective actuators (24) which has a fixed portion (24*b*) fixed to the fixed structure (11), and said weighing means further comprising a control device whereby said actuators (24) can be activated for moving said weight transducers (38) and the support plate (2) between a rest position in which the support plate (2) rests on the fixed structure (11) and a weighing position in which the support plate (2) is supported only by the weight transducers (38) to allow a weighing operation.

2. The kitchen worktop according to claim 1, wherein each of said weight transducers (38) comprises a deformable body (15) fixed at one end to the support plate (2) and at the other end to said movable portion (24*a*) of the corresponding actuator (24), and a strain gauge associated with said deformable body (15) and connected to an electronic circuit of said control device.

3. The kitchen worktop according to claim 2, wherein the support plate (2) has a plate perimeter edge (2*a*) overlapping a support perimeter edge (11*a*) of the fixed structure (11), and at least one elastic element (26) is arranged between said plate perimeter edge (2*a*) and said support perimeter edge (11*a*) such that it is compressed between both edges when the support plate (2) is in said rest position.

4. The kitchen worktop according to claim 3, wherein said elastic element (26) is an elastic gasket attached to a lower surface of the support plate (2) along the entire plate perimeter edge (2*a*).

5. The kitchen worktop according to claim 1, 2 or 3, wherein the support plate (2) has a rectangular shape defining four corners and is supported by four of the weight transducers (38) fixed to the support plate (2) in positions adjacent to said four corners.

6. The kitchen worktop according 1, wherein at least one treatment area (4) of the support plate (2) is associated with rotary blade driving means (32) comprising rotating magnetic field generating means for creating a rotating magnetic field in said treatment area (4) below the support plate (2) capable of magnetically transmitting torque to an upper magnetic coupling member (54) connected to rotary blades (53) installed in a cooking container (50) located on the treatment area (4) of the support plate (2).

7. The kitchen worktop according to claim 6, wherein said rotary blade driving means (32) are associated with activation/deactivation means for substantially activating and deactivating said magnetic field exerted by said rotating magnetic field generating means through the support plate (2).

8. The kitchen worktop according to claim 6, wherein said rotating magnetic field generating means comprise a lower magnetic coupling member (5) rotatably arranged in said treatment area (4) below the support plate (2) and an operatively connected drive motor (6) for rotating said lower magnetic coupling member (5).

9. The kitchen worktop according to claim 7, wherein said rotating magnetic field generating means comprise a lower magnetic coupling member (5) rotatably arranged in said treatment area (4) below support plate (2) and an operatively connected drive motor (6) for rotating said lower magnetic coupling member (5).

10. The kitchen worktop according to claim 8, wherein said activation/deactivation means comprise position changing means (33) for moving the lower magnetic coupling member (5) rotatably arranged in said treatment area (4) below the support plate (2) and an operatively connected drive motor (6) for rotating said between an operative position in which the lower magnetic coupling member (5) is close enough to the support plate (2) so as to magnetically transmit said torque, and an inoperative position in which the lower magnetic coupling member (5) is far enough from the support plate (2) so as to not transmit the torque.

11. The kitchen worktop according to claim 6, wherein said rotating magnetic field generating means comprise a plurality of electromagnets which are distributed in a circular arrangement in the treatment area (4) below the support plate (2) and controlled by said control device to be consecutively activated and deactivated to create said rotating magnetic field.

12. The kitchen worktop according to claim 7, wherein Said rotating magnetic field generating means comprise a plurality of electromagnets which are distributed in a circular arrangement in the treatment area (4) below the support plate (2) and controlled by said control device to be consecutively activated and deactivated to create said rotating magnetic field.

13. The kitchen worktop according to claim 6, wherein said said rotary blade driving means (32) are supported in the support plate (2).

14. The kitchen worktop according to claim 9, wherein said position changing means (33) are supported in the support plate (2).

15. The kitchen worktop according to claim 10, wherein said control device comprises a user interface (31) that is associated with the support plate (2) and connected to an electronic power and control circuit, said user interface (31) being configured for allowing a user to control said weighing means and/or said heating means (34) and/or said rotary blade driving means (32) and/or said position changing means (33).

* * * * *